US008777492B2

(12) United States Patent
Yamamoto et al.

(10) Patent No.: US 8,777,492 B2
(45) Date of Patent: Jul. 15, 2014

(54) WHEEL BEARING APPARATUS (71) Applicant: NTN Corporation, Osaka (JP)

(72) Inventors: Kazunari Yamamoto, Iwata (JP);
Kazuhisa Shigeoka, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/677,427

(22) Filed: Nov. 15, 2012

(65) Prior Publication Data
US 2013/0076111 A1 Mar. 28, 2013

Related U.S. Application Data (63) Continuation of application No. PCT/JP2011/061234, filed on May 16, 2011.

(30) Foreign Application Priority Data

May 17, 2010 (JP) ................................. 2010-112824

(51) Int. Cl.
F16C 19/00 (2006.01)
F16C 33/78 (2006.01)
B60B 27/00 (2006.01)

(52) U.S. Cl.
CPC ........... F16C 33/7813 (2013.01); B60B 27/001 (2013.01); B60B 27/0084 (2013.01)
USPC ........... 384/544; 384/547; 384/571; 384/585; 301/105.1; 301/109

(58) Field of Classification Search
USPC ......... 384/504, 535–536, 543–544, 548–547, 384/564, 571, 585, 589, 619, 625
See application file for complete search history.

(56) References Cited

U.S. PATENT DOCUMENTS 3,854,735 A * 12/1974 Maurer et al. ................. 277/638
5,324,207 A * 6/1994 Itoh et al. ....................... 439/125
6,386,764 B1 * 5/2002 Moore et al. .................. 384/585

(Continued)

FOREIGN PATENT DOCUMENTS

JP 6-79606 11/1994
JP 2597023 6/1999

(Continued)

Primary Examiner — Marcus Charles
(74) Attorney, Agent, or Firm — Harness, Dickey & Pierce, P.L.C.

(57) ABSTRACT

A wheel bearing apparatus of a semi-floating type has a pilot portion 21 on an outer member 20. The pilot portion includes a cylindrical portion 21a and a tapered portion 21b. The tapered portion 21b gradually decreases in diameter from the cylindrical portion 21a to an end surface of the inboard side. A fitting portion 16 of an axle housing 14 corresponds to the shape of the pilot portion 21. An annular groove 22 is formed at the tapered portion 21b of the pilot portion 21. A seal ring 23 is mounted in the annular groove 22. An outer diameter d3 of the seal ring 23, after mounting, is set smaller than an inner diameter d4 of the cylindrical portion 16a of the axle housing 14. The seal ring elastically contacts the axle housing 14. A slight gap of a fitting portion between the outer member 20 and the axle housing 14 is blocked off.

11 Claims, 6 Drawing Sheets

(56) References Cited

U.S. PATENT DOCUMENTS

| | | | |
|---|---|---|---|
| 6,573,705 B1 * | 6/2003 | Tajima et al. | 324/174 |
| 7,393,140 B2 * | 7/2008 | Norimatsu et al. | 384/544 |
| 2004/0258337 A1 | 12/2004 | Norimatsu et al. | |
| 2007/0122071 A1 | 5/2007 | Ohtsuki | |
| 2008/0159673 A1 | 7/2008 | Muranaka et al. | |
| 2008/0205810 A1 * | 8/2008 | Maeda et al. | 384/544 |
| 2009/0047890 A1 * | 2/2009 | Yano et al. | 454/143 |

FOREIGN PATENT DOCUMENTS

| | | |
|---|---|---|
| JP | 2005-016551 | 1/2005 |
| JP | 2005-054994 | 3/2005 |
| JP | 2005-195168 | 7/2005 |
| JP | 2005-297944 | 10/2005 |
| JP | 2007-326402 | 12/2007 |
| JP | 2008045674 A * | 2/2008 |
| JP | 2008-528878 | 7/2008 |

* cited by examiner

WHEEL BEARING APPARATUS

CROSS-REFERENCE TO RELATED APPLICATIONS

This application is a continuation of International Application No. PCT/JP2011/061234, filed May 16, 2011, which claims priority to Japanese Application No. 2010-112824, filed May 17, 2010. The disclosures of the above applications are incorporating herein by reference.

FIELD

The present disclosure relates to a wheel bearing apparatus to rotatably support a wheel of a vehicle, such as an automobile, relative to a suspension apparatus of the vehicle and, more particularly, to a wheel bearing apparatus of a semi-floating type where a driving wheel is supported by a double row rolling bearing.

BACKGROUND

Figure 6:
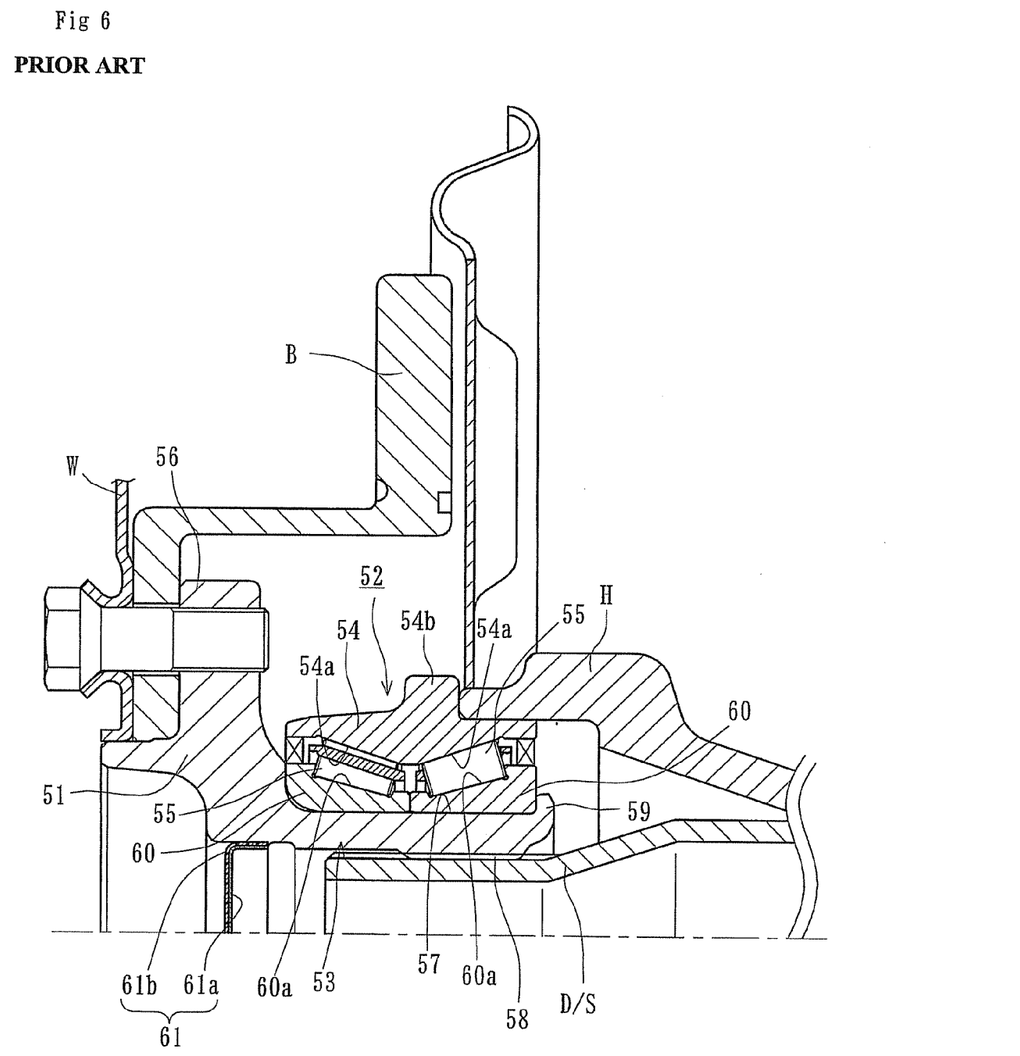
FIG. 6 is a longitudinal-section view of a prior art wheel bearing apparatus.

In a vehicle such as a truck with a body and a frame structure, an axle structure of the full-floating driving wheel type has been widely adopted. In recent driving wheel supporting structures, a double row rolling bearing unit structure has been widely adopted. This improves the readiness of assembly and a reduction of weight and size. One example of such a semi-floating type wheel bearing apparatus of the prior art is shown in FIG. 6.

The wheel bearing apparatus is aimed to reduce the weight and size, prevent the penetration of rain water or dust and prevent the leakage of a differential gear oil. Thus, a wheel hub 51 and a double row rolling bearing 52 are configured as a unit and are connected to a drive shaft D/S. The double row rolling bearing 52 includes an inner member 53, an outer member 54 and double row conical rollers 55, 55 to rollably accommodate between both members 53, 54. The wheel hub 51 has an integral wheel mounting flange 56 to attach with a wheel W and a brake rotor B. They attach at one end of the outer circumference to the mounting flange 56. A cylindrical portion 57 extends from the wheel mounting flange 56 in an axial direction to form the wheel hub 51. Further, serrations 58 are formed in the inner circumference of the cylindrical portion 57 to receive the drive shaft D/S for transmitting torque.

Double row rolling bearing 52 has an outer member 54, a pair of inner rings 60, 60 and conical rollers 55, 55. The outer member inner circumference has double row tapered outer raceway surfaces 54a, 54a. The outer member outer circumference has a body mounting flange 54b that is fixed to an axle housing H. The pair of inner rings 60, 60, is inserted in the outer member 54. Each ring 60 has a tapered inner raceway surface 60a that, in its outer circumference, is formed opposite to the double row outer raceway surfaces 54a, 54a. The double row conical rollers 55, 55 are rollably accommodated between both raceway surfaces 54a, 60a. The pair of inner rings 60, 60 are press-fit into the cylindrical portion 57 formed in the outer circumference of the wheel hub 51. A caulked portion 59 prevents removal of the inner rings 60 in the axial direction with respect to the wheel hub 51. The caulked portion 59 is formed by plastic deforming an end portion of the cylindrical portion 57 in the radial direction. Thus, the forward end surface of the pair of inner rings 60, 60 are set in an abutting configuration as a so-called back-abutted type double row conical roller bearing.

A cap 61 is press-fit in an opening of the wheel hub 51. The cap 61 includes a metal core 61a and an elastic member 61b. The metal core is made of a steel plate that is press-formed, into a substantially "C"-shaped cross-section, from an austenitic-stainless steel sheet (JIS SUS 304 etc.) or preserved cold rolled steel sheet (JIS SPCC etc.). The elastic member 61b is rubber and is bonded, via vulcanization, to at least the fitting portion of the metal core 61a. The elastic member 61b is elastically deformed into the fitting surface to fluid-tightly seal the inside. Accordingly, it is possible to completely prevent leakage of the differential gear oil to the outside and the penetration of rain water or dust from the outside into the drive shaft. This prohibits mixing of the water or dust into the differential gear oil. In addition, the cap 61 is almost uninfluenced by the elastic deformation of the wheel hub 51 even though the wheel hub 51 repeatedly receives a moment load and is elastic deformed when driving the vehicle. (See Japanese Laid-open Patent Publication No. 2005-297944.

However, in the wheel bearing apparatus of the prior art, there are concerns that rain water or dust from the outside may penetrate through a gap between the axle housing H and the double row rolling bearing 52. Thus, the differential gear oil may leak outside. In this case, the rain water or dust is mixed with the differential gear oil and the leaked differential gear oil leaks into the surroundings.

SUMMARY

It is, therefore, an object of the present disclosure to provide a wheel bearing apparatus that prevents penetration of rain water or dust and leakage of differential gear oil. Thus, the sealing effect is increased and its reliability is ensured over the long term.

To achieve the object, a wheel bearing apparatus includes an axle housing receiving a drive shaft connected to a differential gear. The axle housing is supported on the lower surface of a vehicle body. A wheel hub is joined to the drive shaft. The wheel hub has an integrally formed wheel mounting flange to attach a wheel. A cylindrical portion extends from the mounting flange in an axial direction providing an outer circumference for the wheel hub. A wheel bearing is fit between the cylindrical portion of the wheel hub and an opening of the axle housing. The wheel bearing rotatably supports the wheel. The wheel bearing outer member has an integral body mounting flange on its circumference to attach to the axle housing. A pilot section is fit into the axle housing at an end portion of an inner side of the axle housing. Double row outer raceway surfaces are integrally formed in the inner circumference of the outer member. An inner member is press-fit into the cylindrical portion of the wheel hub. The inner member has at least one inner ring that includes an inner raceway surface that is opposite to the double row outer raceway surfaces. Double row rolling bodies are rollably accommodated between the inner member and both raceway surfaces of the outer member via a cage. A seal is mounted in an opening of an annular space formed between the outer member and the inner member. An annular groove is formed in the pilot portion of the outer member. A seal ring, formed from a synthetic rubber, is mounted in the annular groove. The seal ring elastically contacts the axle housing. Thus, a slight gap of the fitting portion between the outer member and the axle housing is blocked off.

The wheel bearing apparatus includes the axle housing receiving the drive shaft connected to the differential gear. The axle housing is supported on the lower surface of the vehicle body. The wheel hub has the integral wheel mounting flange. The wheel bearing is configured as a double row rolling bearing fit between the wheel hub and the opening of the axle housing. The annular groove is formed at the pilot portion of the outer member. The seal ring is formed from synthetic rubber. The seal ring is mounted in the annular groove and elastically contacts the axle housing. Thus, the slight gap between the fitting portion of the outer member and the axle housing is blocked off. Thus, the wheel bearing apparatus can prevent the penetration of rain water or dust and leakage of differential gear oil. Accordingly, the sealing effect is increased and reliability is ensured over the long term.

The pilot portion of the outer member includes a cylindrical portion extending axially from the body mounting flange. A tapered portion, extending from the cylindrical portion, gradually decreases in its diameter from the cylindrical portion to the end surface of the inner side. The fitting portion of the axle housing is formed to correspond to the shape of the pilot portion of the outer member. Accordingly, the assembly of the bearing portion to the axle housing is easily performed and assembly work can be simplified.

The annular groove is formed at the tapered portion of the pilot portion. Accordingly, readiness of assembly of the bearing portion to the axle housing is improved.

An outer diameter of the seal ring, after mounting, is set to be smaller than the inner diameter of the cylindrical portion of the axle housing. Accordingly, when the bearing portion is assembled to the axle housing, it is possible to prevent the seal ring from being bitten by the axle housing due to the seal ring bending.

An outer diameter of the seal ring, after mounting, is set to be smaller than the inner diameter of the cylindrical portion of the axle housing. Accordingly, when the bearing portion is assembled into the axle housing, it is possible to reliably prevent the seal ring from being bitten by the axle housing.

A predetermined hardened layer is formed by high frequency induction quenching at the double row outer raceway surfaces of the outer member. An effective hardened layer depth of the hardened layer is set to be in a range of 2 mm to 4.5 mm. The shortest distance between the annular groove and the outer raceway surface is set to be 4.5 mm or more. Accordingly, the annular groove is not subject to thermal influence due to the quenching. Thus, its heat-treatment deformation can be prevented. Simultaneously, a decrease in the strength due to annealing or the like can be prevented and reliability can be improved.

The annular groove is formed with a substantially rectangular cross-section. A corner R, in a near side of the outer raceway surface in corners R of the annular groove is set to be larger than a corner R in a far side. Accordingly, since the distance from the outer raceway surface is substantially larger than that of the same corner R, it is advantageous, with respect to the heat treatment deformation and when the bending load is repeatedly applied, that the strength is increased and the durability can be improved.

The annular groove is formed in a substantially semi-circular cross-section. The groove bottom portion has a single radius of curvature. Accordingly, the annular groove is subject to almost no thermal influence due to the quenching. Also, a decrease in the strength due to the cut-out effect can be suppressed.

A compression set in the rubber material values of the seal ring is 40% or less in 120° C.×70 hours and TR10 value (elongation rate 50%) is −20° C. or less. Accordingly, the distortion recovery characteristic is satisfactory even in a low temperature region and the desired sealing effect can be maintained.

The color of the seal ring is set as a warm color. Accordingly, when assembling, forgetting to mount or overlooking confirmation of the mounting of the seal ring can be prevented and the assembly work can be simplified.

The same grease that is enclosed inside of the bearing is coated beforehand on the seal ring. The seal ring is mounted in a state where the grease is attached to its surface. Accordingly, mounting ability of the seal ring can be improved. Also, the bearing portion can be smoothly fit into the axle housing without bending even though the seal ring contacts the axle housing during assembling.

The seal ring is selected from hydrogenation acrylonitrile-butadiene rubber, ethylene propylene rubber, polyacrylic rubber, fluorine rubber or silicon rubber. Accordingly, the seal ring has excellent heat resistance properties and its chemical resistance and durability is improved.

The wheel bearing apparatus includes an axle housing receiving a drive shaft connected to a differential gear. The axle housing is supported on the lower surface of a vehicle body. A wheel hub is joined to the drive shaft. The wheel hub has an integral wheel mounting flange to attach a wheel. A cylindrical portion extends from the wheel mounting flange in an axial direction and provides an outer circumference of the wheel hub. A wheel bearing is fit between the cylindrical portion of the wheel hub and an opening of the axle housing. The wheel bearing rotatably supports the wheel. The wheel bearing has an outer member with an integral body mounting flange, to attach to the axle housing, on its outer circumference. A pilot section is fit into the axle housing at an end portion of an inner side. Double row outer raceway surfaces are integrally formed in the inner circumference of the outer member. An inner member is press-fit onto the cylindrical portion of the wheel hub. The inner member includes at least one inner ring with an inner raceway surface formed opposite to the double row outer raceway surfaces. Double row rolling bodies are rollably accommodated between the inner member and both raceway surfaces of the outer member, via a cage. A seal is mounted in an opening of an annular space formed between the outer member and the inner member. An annular groove is formed at the pilot portion of the outer member. A seal ring, formed of a synthetic rubber, is mounted in the annular groove. The seal ring elastically contacts the axle housing. Thus, a slight gap of a fitting portion between the outer member and the axle housing is blocked off. Accordingly, the wheel bearing apparatus prevents penetration of rain water or dust and leakage of differential gear oil. Thus, the sealing effect is increased and reliability is ensured over the long term.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The semi-floating type wheel bearing apparatus includes an axle housing to receive a driving shaft connected to a differential gear. The axle housing is supported on the lower surface of a vehicle body. A wheel hub is joined to the drive shaft via serrations. The wheel hub has an integral wheel mounting flange to attach a wheel. A cylindrical portion extends from the wheel mounting flange in an axial direction and provides an outer circumference of the wheel hub. A wheel bearing, to rotatably support the wheel, is fit between the cylindrical portion of the wheel hub and an opening of the axle housing. An outer member of the wheel bearing has an integral body mounting flange on its outer circumference to be attached to the axle housing. A pilot section at an end portion of an inboard side of the outer member is fit into the axle housing. Double row outer raceway surfaces are integrally formed in the outer member inner circumference. A pair of inner rings, each with an inner raceway surface on their outer circumference, is formed opposite to the double row outer raceway surface. Double row rolling bodies are rollably accommodated between the pair of inner rings and both raceway surfaces of the outer member, via a cage. A seal is mounted in an annular space opening formed between the outer member and the pair of inner rings. The inner rings of the wheel bearing are fit on the cylindrical portion of the wheel hub. The inner rings are fixed to the wheel hub in the axial direction by a caulked portion. The caulked portion is formed by plastically deforming the end of the cylindrical portion radially outward. The pilot portion of the outer member is configured as a cylindrical portion extending from the body mounting flange. A tapered portion, gradually decreasing in the diameter, extends from the cylindrical portion to the end surface of the inboard side. The fitting portion of the axle housing is formed with a corresponding shape of the pilot portion of the outer member. An annular groove, with a substantially rectangular cross-section, is formed at the tapered portion of the pilot portion. A seal ring, formed of a synthetic rubber, is mounted in the annular groove. The outer diameter of the seal ring, after mounting, is set to be smaller than the inner diameter of the cylindrical portion of the axle housing. The seal ring elastically contacts the axle housing. Thus, a slight gap of a fitting portion between the outer member and the axle housing is blocked off.

Hereinafter, embodiment of the present disclosure is described in detail based on the drawings.

Figure 1:
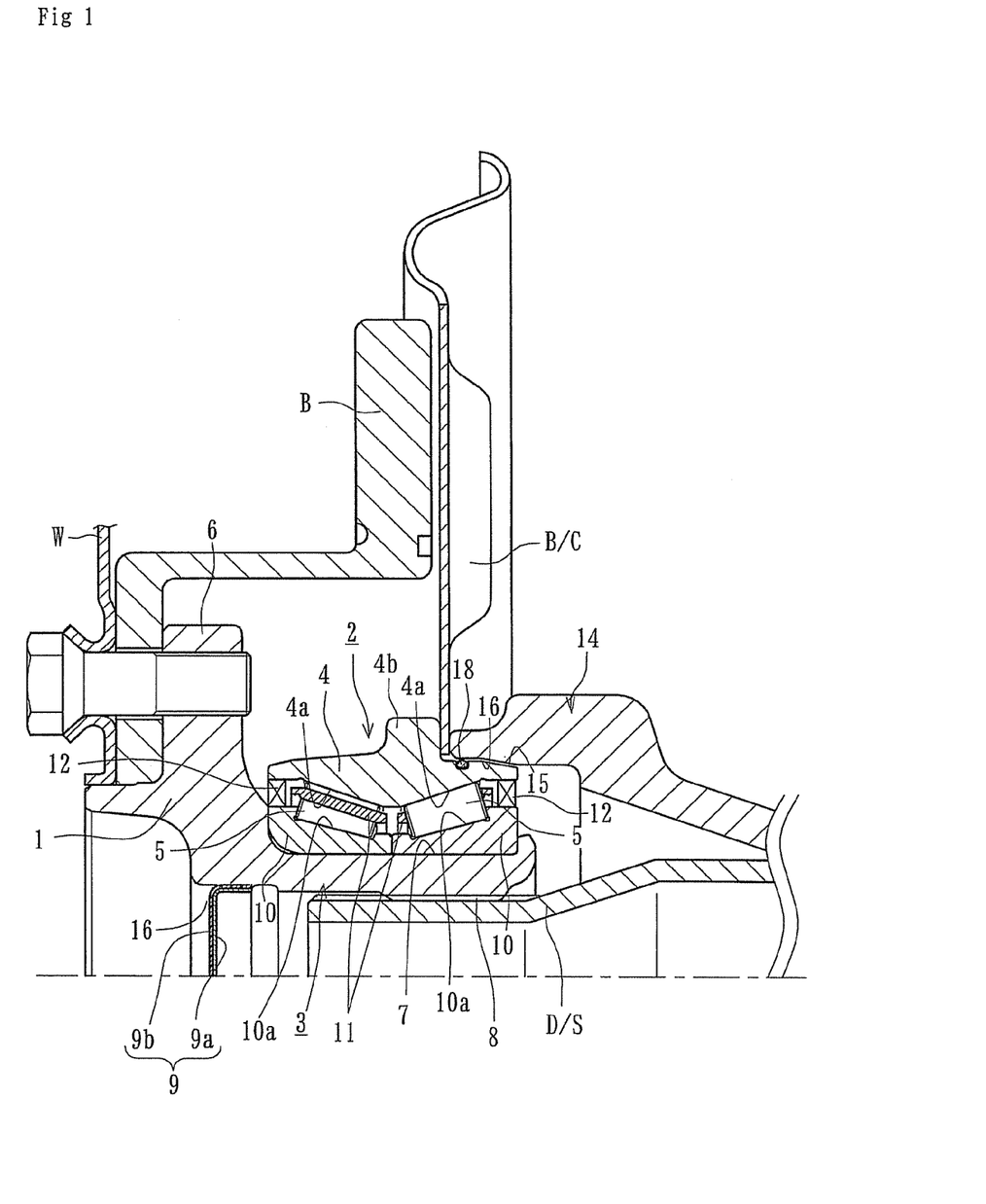
FIG. 1 is a longitudinal-section view around an underbody of a vehicle illustrating an embodiment of a wheel bearing apparatus of the present disclosure.
Figure 2:
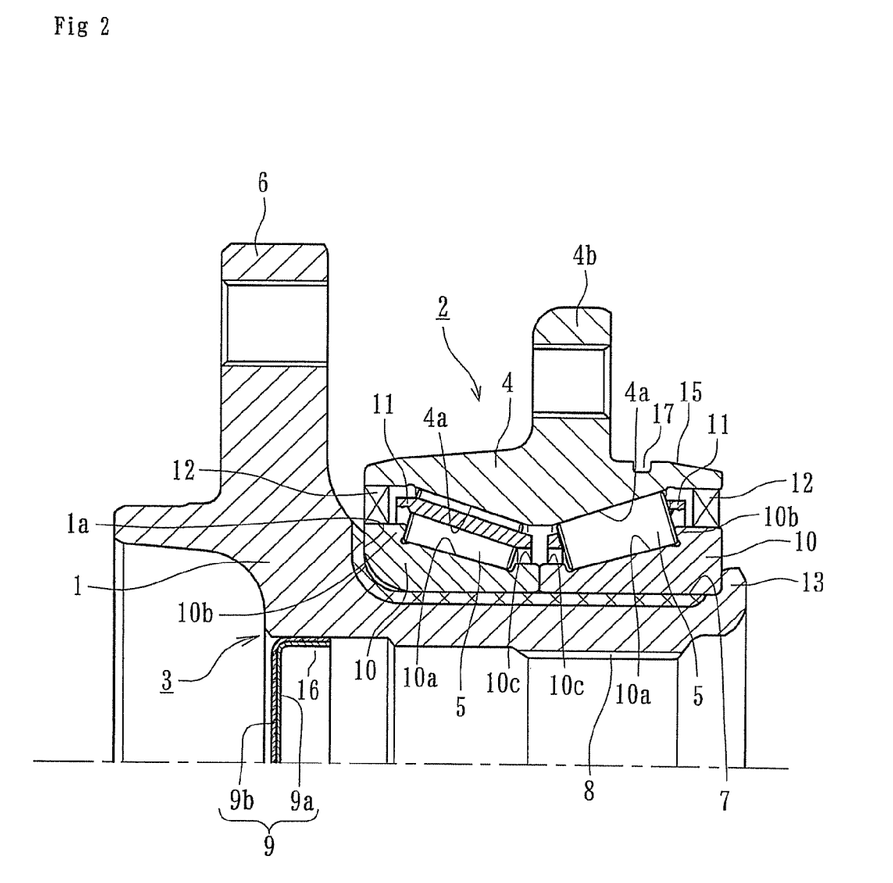
FIG. 2 is a longitudinal-section view illustrating the wheel bearing apparatus in FIG. 1.
Figure 3:
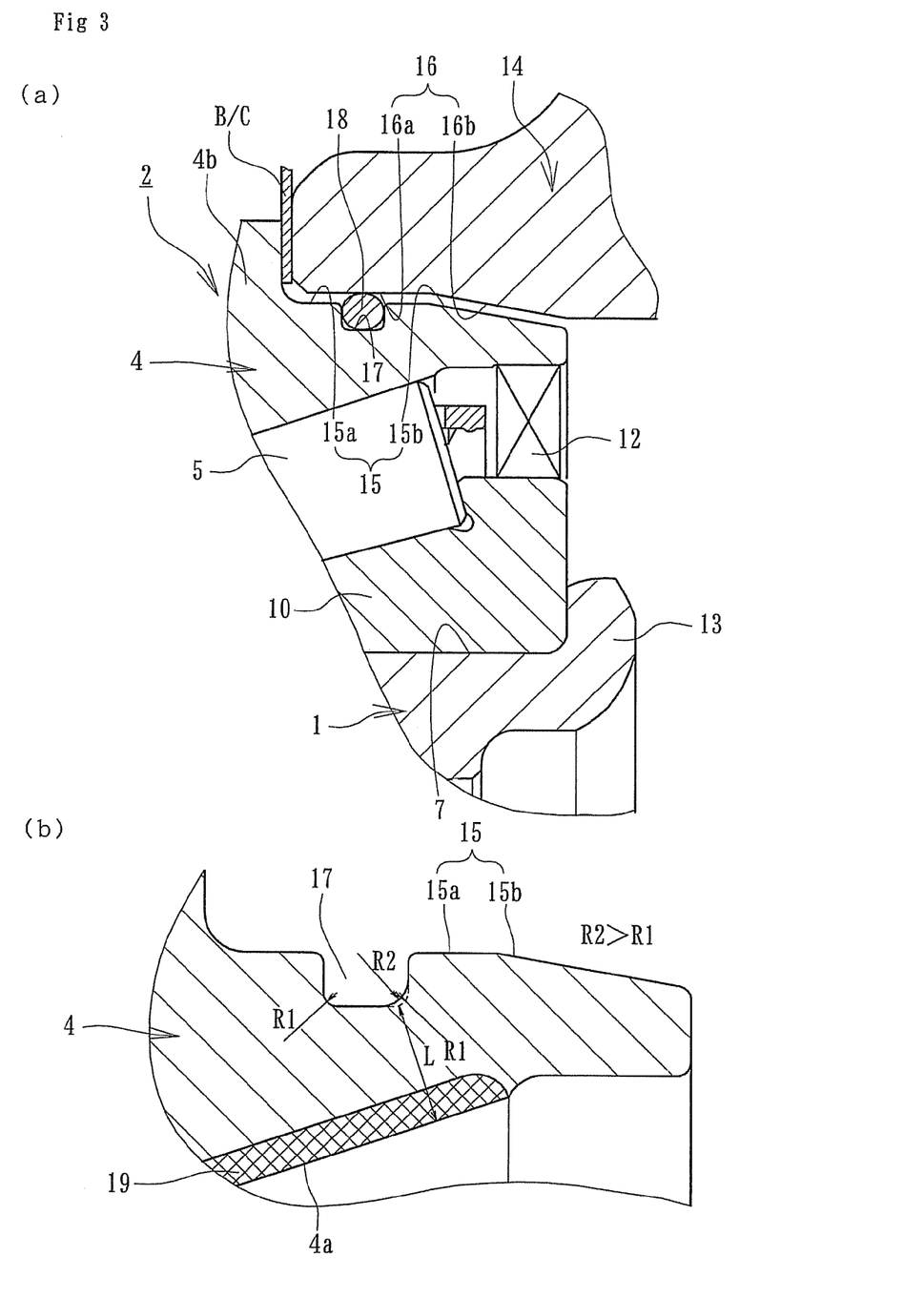
FIG. 3(a) is an enlarged cross-section view of a main portion of FIG. 2.
FIG. 3(b) is a partially enlarged cross-section view of FIG. 3(a).
Figure 4:
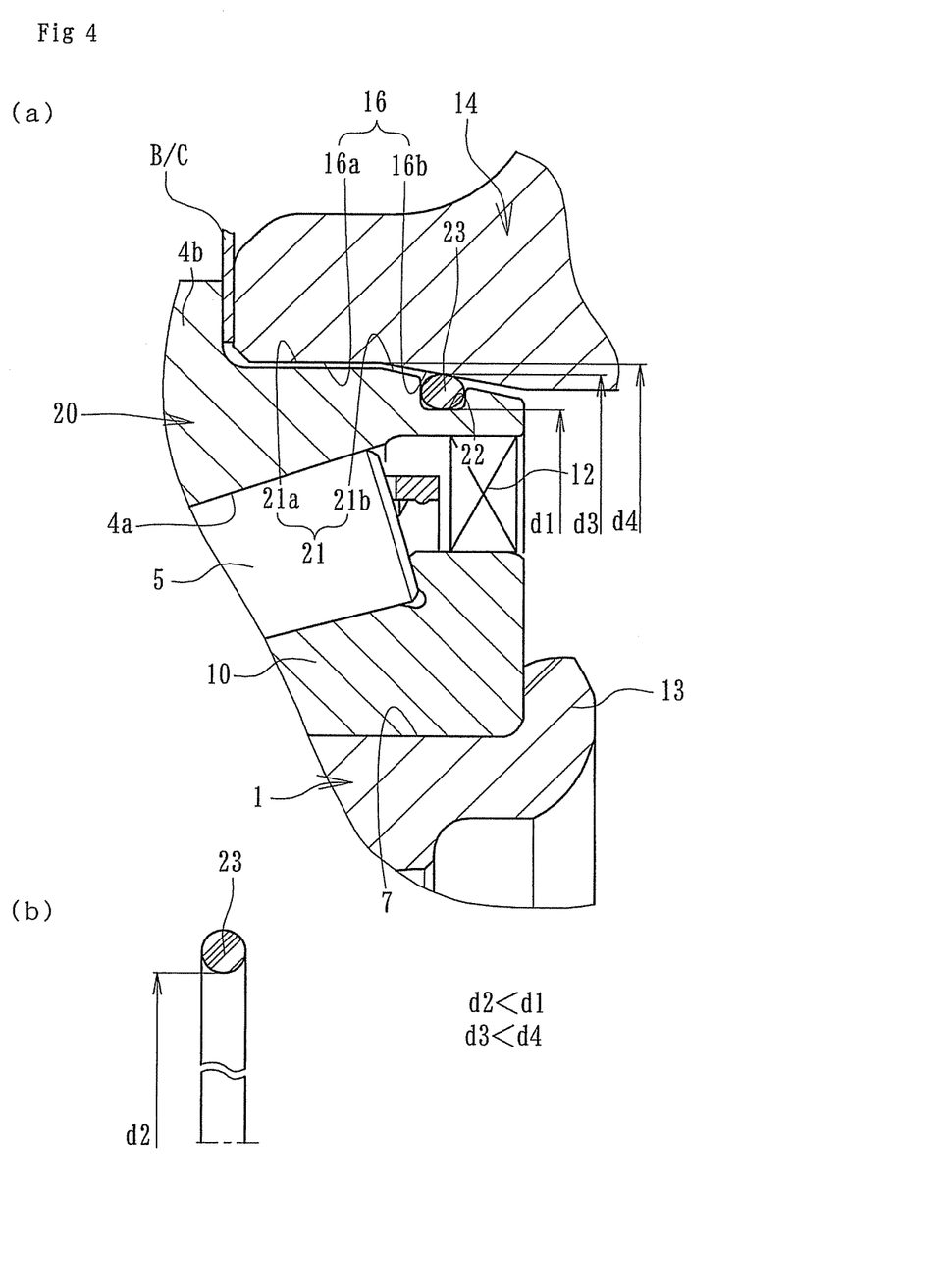
FIG. 4(a) is an enlarged cross-section view of a main portion illustrating a modification of FIG. 3(a)
FIG. 4(b) is a cross-sectional view illustrating a seal ring unit of FIG. 4(a)
Figure 5:
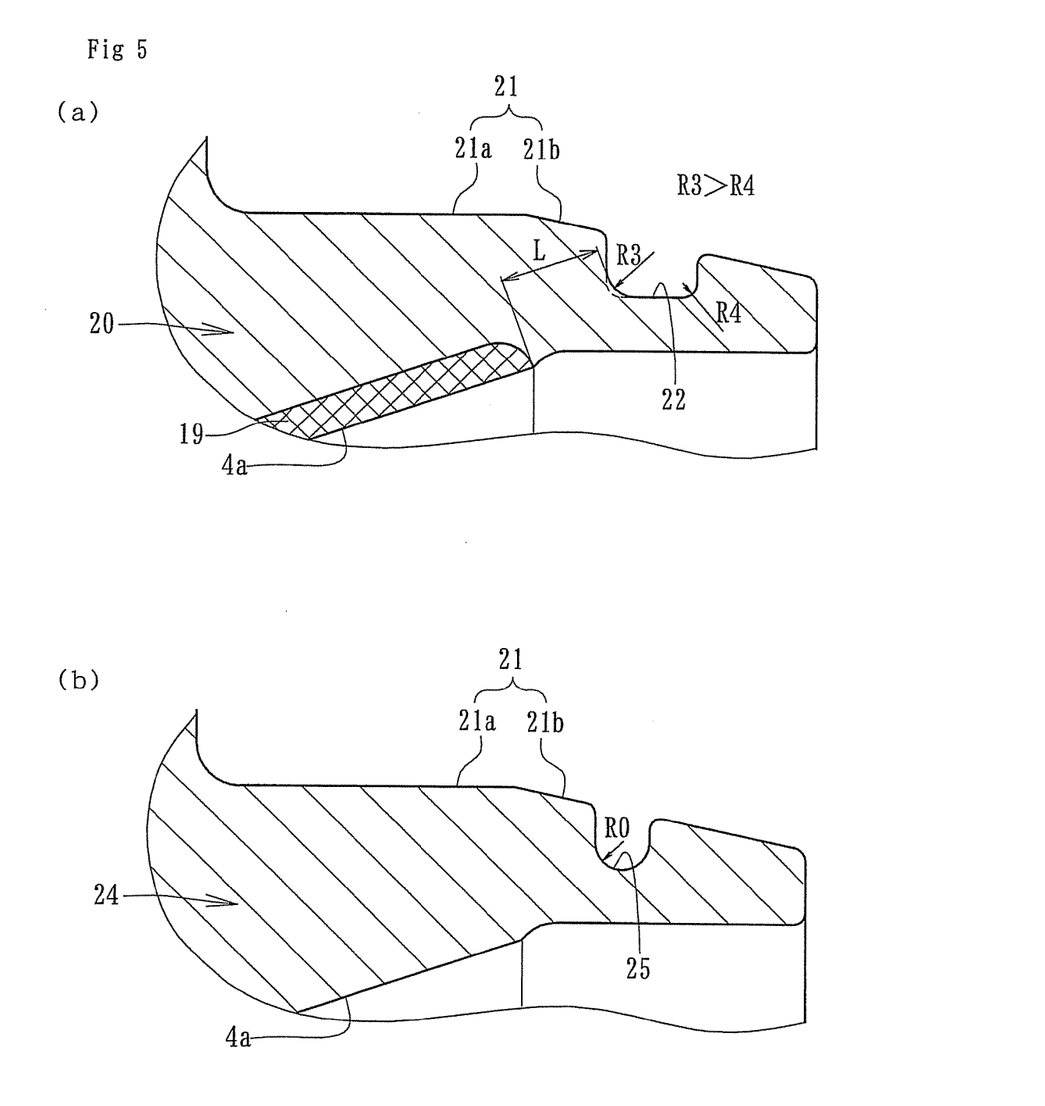
FIG. 5(a) is a partially enlarged cross-section view of FIG. 4.
FIG. 5(b) is a partially enlarged cross-section view illustrating a modification of FIG. 5(a)

FIG. 1 is a longitudinal-section view of around an underbody of an embodiment of a wheel bearing apparatus of the present disclosure. FIG. 2 is a longitudinal-section view illustrating the wheel bearing apparatus in FIG. 1. FIG. 3(a) is an enlarged cross-section view of a main portion of FIG. 2. FIG. 3(b) is a partially enlarged cross-section view of FIG. 3(a). FIG. 4(a) is an enlarged cross-section view of a main portion illustrating a modification of FIG. 3(a). FIG. 4(b) is a cross-sectional view illustrating a seal ring unit of FIG. 4(a). FIG. 5(a) is a partially enlarged cross-section view of FIG. 4. FIG. 5(b) is a partially enlarged cross-section view illustrating a modification of FIG. 5(a). In the description below, the side of the bearing positioned to the outside of the vehicle, when it is mounted on the vehicle, is referred to as the "outboard" side (the left side in FIG. 1). The side of the bearing positioned to the center of the vehicle is referred to as the "inboard" side (the right side in FIG. 1).

The semi-floating type wheel bearing apparatus includes a wheel hub 1 and double row rolling bearing 2, as a unit, connected to the drive shaft D/S. The double row rolling bearing 2 includes an inner member 3, an outer member 4 and double row rolling bodies (conical rollers) 5, 5. The double row rolling bodies 5, 5 are rollably accommodated between both members 3, 4. Here, the inner member 3 includes the wheel hub 1 and a pair of inner rings 10, 10 press-fit onto the wheel hub 1.

The wheel hub 1 has an integral wheel mounting flange 6 to attach the wheel W and a brake rotor B at an end portion of the outboard side. In addition, a cylindrical portion 7, forming the outer circumference of the wheel hub, extends from the wheel mounting flange 6 in an axial direction. Serrations (or splines) 8 are formed in the cylindrical portion inner circumference. Thus, the drive shaft D/S is inserted, via the serrations 8. The wheel hub 1 and the drive shaft D/S are removably joined to freely transmit torque.

As shown in FIG. 2, the double row rolling bearing 2 includes the outer member 4 formed with double row tapered outer raceway surfaces 4a, 4a on its inner circumference. A vehicle body mounting flange 4b, to be secured in an axle housing 14, is formed on the outer member outer circumference. A pair of inner rings 10, 10 is inserted in the outer member 4. The rings 10, 10 include tapered inner raceway surfaces 10a on their outer circumference opposite to the double row outer raceway surfaces 4a, 4a. Double row rolling bodies 5, 5 are accommodated between both raceway surfaces 4a, 10a. A cage 11 rollably holds the double row rolling bodies 5, 5.

The pair of inner rings 10, 10 is formed with, at a larger diameter side of the inner raceway surface 10a, a large flange 10b. The flange 10b guides the rolling body 5. A small flange 10c, at the small diameter side, prevents the rolling body 5 from being removed. Thus, the pair of inner rings 10, 10 is arranged so that their forward ends abut each other. Thus, this forms a so-called back-abutted type double row conical roller bearing.

Seals 12, 12 are mounted at annular space openings formed between the outer member 4 and inner ring 10. The seals 12, 12 prevent leakage of lubricating grease sealed within the bearing to the outside. Also, the seals 12, 12 prevent the penetration of rain water or dust from the external environments into the bearing. The inboard side seal 12 further prevents penetration or penetration of differential gear oil into the inside of the bearing via the serration 8 of the wheel hub 1.

The pair of inner rings 10, 10 is press-fit onto the cylindrical portion 7 of the wheel hub 1, via a predetermined interference. The inner rings 10, 10 are fixed to the wheel hub 1 in the axial direction by a caulked portion 13. The caulked portion 13 is formed by plastically deforming the end of the cylindrical portion 7 radially outward. Thus, this provides a state where a preload is on the bearing. Since this embodiment adopts the self-retaining structure of the second generation, it is not required to control the amount of preload as in a conventional manner by tightly fastening a nut or the like against the inner ring. Accordingly, it is possible to substantially reduce the number of parts and thus to improve the readiness of assembly and maintain the amount of preload over the long term as well as to reduce its manufacturing cost, weight and size.

The wheel hub 1 is made of medium and high carbon steel such as S53C including carbon of 0.40 to 0.80% by weight. It is hardened by high frequency induction quenching so that the double row rolling bearing 2 has a surface hardness of 50 to 64 HRC. The hardened portion is shown in drawings by cross-hatched lines. The hardened portion extends from the shoulder portion 1a through the cylindrical portion 7. The caulked portion 13 remains as an unhardened portion with its surface hardness of 25 HRC or less. This improves the durability and workability of the caulked portion 13 during plastic deformation. Also, this prevents the generation of cracks. Thus, it improves the reliability and the quality.

Similar to the wheel hub 1, the outer member 4 is also made of medium and high carbon steel such as S53C including carbon of 0.40 to 0.80% by weight. At least the double row outer raceway surfaces 4a, 4a are hardened by high frequency induction quenching so that their surface hardness is in a range of 58 to 64 HRC. The inner rings 10 and the rolling body 5 are made of a high carbon chrome bearing steel such as SUJ2. They are hardened to their core by dip quenching to have a surface hardness of HRC 60 to 64. Although it is illustrated as a double row conical roller bearing using tapered roller as the rolling bodies 5, 5, a double row angular ball bearing using balls may be also used. In addition, although it is illustrated with the wheel bearing apparatus configured as a second generation structure, with the pair of inner rings 10, 10 press-fit and fixed to the cylindrical portion 7 of the wheel hub 1, the present disclosure is not limited to the description and may be a wheel bearing apparatus configured as a third generation structure, with the inner raceway surface formed directly on the outer circumference of the wheel hub, even though not illustrated.

In this embodiment, a cap 9 is press-fit into an opening of the wheel hub 1 at its outboard side. The cap 9 includes a metal core 9a made of a steel plate press-formed to have a substantially "C"-shaped cross-section. The steel plate is an austenitic-stainless steel sheet (JIS SUS 304 etc.) or preserved cold rolled steel sheet (JIS SPCC etc.). An elastic member 9b, of a synthetic rubber, is bonded, via vulcanization, to at least the fitting portion of the metal core 9a. The elastic member 9b is elastically deformed in the fitting surface to fluid-tightly seal the inside. Accordingly, it is possible to prevent leakage of the differential gear oil to the outside and the penetration of rain water or dust from the outside into the drive shaft and thus mix with the differential gear oil.

Here, as shown in the enlarged view in FIG. 3(a), a pilot portion 15 is formed on the outer member 4. The pilot portion 15 includes a cylindrical portion 15a that extends from the body mounting flange 4b in an axial direction. A tapered portion 15b extends from the cylindrical portion 15a and gradually decreases in diameter from the cylindrical portion 15a to an end surface of the inboard side. In addition, the fitting portion 16 of the axle housing 14 is also configured with a cylindrical portion 16a and a tapered portion 16b. The cylindrical portion 16a is positioned along the cylindrical portion 15a. The tapered portion 16b gradually decreases in diameter from the cylindrical portion 16a to the inboard side corresponding to the shape of the pilot portion 15 of the outer member 4. The double row rolling bearing 2 is fit into the axle housing 14, in a state where the brake cover B/C is clamped. Accordingly, the assembly of the bearing portion to the axle housing 14 is easily performed and the assembly work is simplified. Also, the airtightness of the fitting portion of the bearing portion with the axle housing increases.

Thus, in the embodiment, an annular groove 17, with a rectangular cross-section, is formed at the cylindrical portion 15a of the pilot portion 15. A seal ring 18, with a circular cross-section, is mounted in the annular groove 17. The seal ring 18 is formed of a synthetic rubber such as NBR. The seal ring 18 elastically contacts the axle housing 14. The seal ring 18 cuts off a slight gap of the fitting portion between the outer member 4 and the axle housing 14. Accordingly, the penetration of rainwater or dust and leakage of the differential gear oil are prevented. Thus, the wheel bearing apparatus may be provided where the sealing effect is increased and the reliability is ensured over the long term. The material of the seal ring 18 includes for example, HNBR (hydrogenation acrylonitrile-butadiene rubber), EPDM (ethylene propylene rubber), ACM (polyacrylic rubber) or FKM (fluorine rubber) or silicon rubber which are excellent in heat resistance besides NBR. Specifically, ACM, FKM, EPDM and silicon rubber have excellent heat resistance and chemical resistance and are preferable for the use to contact this type of differential gear oil.

The seal ring 18 is used where the compression set in the rubber material values is 40% or less in 120° C.×70 hours and TR10 value (elongation rate 50%) is −20° C. or less. Accordingly, the distortion recovery characteristic is satisfactory even in a low temperature region and desired sealing effects can be maintained. In addition, the TR10 value means the temperature when the distortion that is given beforehand is recovered by 10% and near the value is empirically used as a low temperature limit value of the rubber material.

In addition, the inner diameter of the seal ring 18, before mounting, is set to be smaller than the diameter of the bottom of the annular groove 17. Accordingly, interference is present when the seal ring 18 is mounted. It is possible to prevent the seal ring 18 bending and then being bitten by the axle housing 14 when the bearing portion is assembled in the axle housing 14. As an inverse configuration, it may be considered that the annular groove is formed at the axle housing and the seal ring is mounted in the annular groove beforehand. However, in this case, it is not preferable because there is concern that when the bearing portion is assembled at the axle housing, the seal ring may contact the outer member and may be removed from the annular groove and then be bitten.

Further, in the embodiment, as shown in 3(b), a predetermined hardened layer 19 is formed at the double row outer raceway surface 4a of the outer member 4 by high frequency induction quenching. The hardened portion is shown in drawings by cross-hatched lines. An effective hardened layer depth of the hardened layer 19 is set to be in a range of 2 to 4.5 mm. Thus, the annular groove 17 is arranged so that the shortest distance L between the annular groove 17, where the seal ring 18 is mounted, and the outer raceway surface 4a is 4.5 mm or more. Accordingly, the annular groove 17 is not subject to thermal influence due to quenching and its heat-treatment deformation can be prevented. Thus, a decrease in the strength due to annealing or the like can be prevented and the reliability can be improved.

A corner R (R2), of the inboard side that is the near side of the outer raceway surface 4a of the corners R in the annular groove 17, is set to be larger (R2>R1) than a corner R (R1) of the outboard side. Accordingly, since the distance from the outer raceway surface 4a is substantially larger than that of the same corner R (R1=R2), it is advantageous against the heat-treatment deformation. Thus, the strength can increase when a bending load is repeatedly applied and the durability can be improved.

In addition, the color of the seal ring 18 is set as a warm color such as red, yellow, orange, the yellow green. Accordingly, when assembling, forgetting to mount or overlooking confirmation of the mounting of the seal ring 18 can be prevented and the assembly work can be simplified.

Further, grease is coated on the seal ring 18 beforehand. The grease is the same grease as enclosed inside the bearing. The seal ring 18 is mounted in a state where the grease is attached to its surface. Accordingly, mounting ability of the seal ring 18 can be improved. The bearing portion can be smoothly fit into the axle housing 14 without bending even though the seal ring 18 contacts the axle housing 14 during assembly.

A modification is illustrated in FIG. 4(a). A pilot portion 21 of an outer member 20 includes a cylindrical portion 21a extending from the body mounting flange 4b in an axial direction. A tapered portion 21b, extending from the cylindrical portion 21a, gradually decrease in diameter from the cylindrical portion 21a to the end surface of the inboard side. The outer member 20 is fit in the axle housing 14 in a state with the brake cover B/C clamped. Thus, in the embodiment, an annular groove 22, with a rectangular cross-section, is formed at the tapered portion 21b of the pilot portion 21. A seal ring 23, with a circular cross-section, is mounted in the annular groove 22.

The seal ring 23 is formed of ACM. The seal ring 23 is molded with a substantially circular cross-section. The seal ring 23 is in elastical contact with the tapered portion 16b of the axle housing 14. Thus, as shown in FIG. 4(b), the inner diameter d2 of the seal ring 23 unit is set smaller (d2<d1) than the groove bottom diameter d1. The outer diameter d3 of the seal ring 23, after mounting, is set smaller (d3<d4) than the inner diameter d4 of the cylindrical portion 16a of the axle housing 14. Accordingly, when the bearing portion is assembled in the axle housing 14, it is possible to reliably prevent the seal ring 23 being bitten by the axle housing 14.

Further, in the embodiment shown in 5(a), a predetermined hardened layer 19 is formed at the double row outer raceway surface 4a of the outer member 20 by high frequency induction quenching. The hardened portion is shown in the drawings by cross-hatched lines. An effective hardened layer depth of the hardened layer 19 is set to be in a range of 2 to 4.5 mm. Thus, the annular groove 22 is arranged so that the shortest distance L between the annular groove 22, where the seal ring 23 is mounted, and the outer raceway surface 4a is 4.5 mm or more. Accordingly, the annular groove 22 is not subject to thermal influence due to quenching and its heat-treatment deformation can be prevented. Simultaneously, a decrease in strength due to annealing or the like can be prevented and the reliability can be improved.

A corner R (R3) of the outboard side, that is the near side of the outer raceway surface 4a of the corners R of the annular groove 22, is set larger (R3>R4) than a corner R (R4) of the inboard side. Accordingly, since the distance from the outer raceway surface 4a is substantially larger than that of the same corner R (R3=R4), it is advantageous against the heat-treatment deformation.

An outer member 24 of FIG. 5(b) is a modification of the outer member 20 of FIG. 5(a). An annular groove 25, where the seal ring 23 is mounted, is formed at the tapered portion 21b of the pilot portion 21. The annular groove 25 has a substantially semi-circular cross-section. It is configured such that the shape of the groove bottom portion is formed with a single radius of curvature R0. Accordingly, the annular groove 25 is subject to nearly no thermal influence due to the quenching. Also, a decrease in the strength due to cut-out effect can be suppressed.

The present disclosure has been described with reference to the preferred embodiments. Obviously, the present disclosure is not limited to the preferred embodiments described above, and modifications and alternations will occur to those of ordinary skill in the art upon reading and understanding the preceding detailed description. It is intended that the present disclosure be construed as including all such alternations and modifications insofar as they come within the scope of their appended claims or the equivalents.

The wheel bearing apparatus of the present disclosure can be applied to wheel bearing apparatus of the semi-floating type where the wheel bearing is mounted at the opening of the axle housing and the drive shaft. Also, the wheel of the vehicle is rotatably supported by the wheel bearing apparatus.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
   an axle housing receiving a drive shaft connected to a differential gear, the axle housing is supported on a lower surface of a vehicle body;
   a wheel hub is joined with the drive shaft, the wheel hub includes an integral wheel mounting flange to attach a wheel, a cylindrical portion, forming an outer circumference of the wheel hub, extends in an axial direction from the wheel mounting flange;
   a wheel bearing is fit between the cylindrical portion of the wheel hub and an opening of the axle housing, the wheel bearing rotatably supports a wheel;
   an outer member of the wheel bearing includes, on an outer circumference, an integral body mounting flange to be attached to the axle housing, the outer member includes a tapered pilot section fit into the axle housing at an end portion of an inner side, double row outer raceway surfaces are integrally formed in an inner circumference of the outer member;
   an inner member is press-fit on the cylindrical portion of the wheel hub, the inner member includes at least one inner ring with an inner raceway surface formed opposite to the double row outer raceway surface;
   double row rolling bodies are rollably accommodated between the inner member and both raceway surfaces of the outer member, via a cage;
   a seal is mounted in an annular space opening formed between the outer member and the inner member; and
   an annular groove is formed at the tapered pilot section of the outer member, a seal ring, formed of a synthetic rubber, is mounted in the annular groove, the seal ring elastically contacts the axle housing and a slight gap of a fitting portion between the outer member and the axle housing is blocked off.

2. The wheel bearing apparatus according to claim 1, wherein the outer member includes a cylindrical portion adjacent the tapered pilot section, the cylindrical portion extends from the body mounting flange in an axial direction, the tapered pilot section, extending from the cylindrical portion, gradually decrease in diameter from the cylindrical portion to an end surface of the inner side, and the fitting portion of the axle housing includes a corresponding shape to the tapered pilot section of the outer member.

3. The wheel bearing apparatus according to claim 1, wherein an inner diameter of the seal ring unit is set smaller than a groove bottom diameter of the annular groove.

4. The wheel bearing apparatus according to claim 1, wherein an outer diameter of the seal ring, after mounting, is set smaller than an inner diameter of the cylindrical portion of the axle housing.

5. The wheel bearing apparatus according to claim 1, wherein a predetermined hardened layer is formed by high frequency induction quenching at the double row outer raceway surfaces of the outer member, an effective hardened layer depth of the hardened layer is set in a range of 2 to 4.5 mm, and a shortest distance between the annular groove and the outer raceway surface is set to be 4.5 mm or more.

6. The wheel bearing apparatus according to claim 1, wherein the annular groove includes a substantially semicircular cross-section and a groove bottom portion has a single radius of curvature.

7. The wheel bearing apparatus according to claim 1, wherein a compression set in the rubber material values of the seal ring is 40% or less in 120° C.×70 hours and a TR10 value (elongation rate 50%) is −20° C. or less.

8. The wheel bearing apparatus according to claim 1, wherein color of the seal ring is set as a warm color.

9. The wheel bearing apparatus according to claim 1, wherein grease is coated on the seal ring beforehand and the grease is same as grease enclosed inside the bearing is coated on the seal ring beforehand and the seal ring is mounted in a state where the grease is attached to its surface.

10. The wheel bearing apparatus according to claim 1, wherein the seal ring is selected from hydrogenation acrylonitrile-butadiene rubber, ethylene propylene rubber, polyacrylic rubber, fluorine rubber or silicon rubber.

11. A wheel bearing apparatus comprising:
an axle housing receiving a drive shaft connected to a differential gear, the axle housing is supported on a lower surface of a vehicle body;
a wheel hub is joined with the drive shaft, the wheel hub includes an integral wheel mounting flange to attach a wheel, a cylindrical portion, forming an outer circumference of the wheel hub, extends in an axial direction from the wheel mounting flange;
a wheel bearing is fit between the cylindrical portion of the wheel hub and an opening of the axle housing, the wheel bearing rotatably supports a wheel;
an outer member of the wheel bearing includes, on an outer circumference, an integral body mounting flange to be attached to the axle housing, the outer member includes a pilot section fit into the axle housing at an end portion of an inner side, double row outer raceway surfaces are integrally formed in an inner circumference of the outer member;
an inner member is press-fit on the cylindrical portion of the wheel hub, the inner member includes at least one inner ring with an inner raceway surface formed opposite to the double row outer raceway surface;
double row rolling bodies are rollably accommodated between the inner member and both raceway surfaces of the outer member, via a cage;
a seal is mounted in an annular space opening formed between the outer member and the inner member;
an annular groove is formed at the pilot portion of the outer member, the annular groove is formed with a substantially rectangular cross-section and a corner (R2, R3) in a near side of the outer raceway surface of the annular groove is set larger than a corner (R1, R4) in a far side; and
a seal ring, formed of a synthetic rubber, is mounted in the annular groove, the seal ring elastically contacts the axle housing and a slight gap of a fitting portion between the outer member and the axle housing is blocked off.

* * * * *